(12) United States Patent
Denny et al.

(10) Patent No.: US 6,698,604 B2
(45) Date of Patent: Mar. 2, 2004

(54) NET ANCHORAGE METHODS AND APPARATUS

(75) Inventors: David S. Denny, Middle Haddam, CT (US); George H. Merritt, West Hartford, CT (US); Barry J. Austin, Houston, TX (US)

(73) Assignee: Sinco, Inc., Middletown, CT (US)

( * ) Notice: Subject to any disclaimer, the term of this patent is extended or adjusted under 35 U.S.C. 154(b) by 0 days.

(21) Appl. No.: 10/072,606

(22) Filed: Feb. 7, 2002

(65) Prior Publication Data

US 2002/0158034 A1 Oct. 31, 2002

Related U.S. Application Data

(60) Provisional application No. 60/267,071, filed on Feb. 7, 2001, and provisional application No. 60/272,278, filed on Feb. 28, 2001.

(51) Int. Cl.[7] .................................................. A47F 5/00
(52) U.S. Cl. ........................ 211/189; 211/180; 211/183; 182/138

(58) Field of Search ................................ 211/189, 180, 211/183; 182/138

(56) References Cited

U.S. PATENT DOCUMENTS

| | | | | | |
|---|---|---|---|---|---|
| 4,981,225 | A | * | 1/1991 | Cole | 211/183 |
| 4,986,389 | A | * | 1/1991 | Halligan et al. | 182/138 |
| 5,170,829 | A | * | 12/1992 | Duncan et al. | 211/191 X |
| 5,573,125 | A | * | 11/1996 | Denny | 211/183 |
| 5,984,121 | A | * | 11/1999 | Cole | 211/183 |
| 6,068,085 | A | * | 5/2000 | Denny et al. | 182/138 |
| 6,098,750 | A | * | 8/2000 | Reynolds et al. | 182/138 |
| 6,182,790 | B1 | * | 2/2001 | Denny et al. | 182/138 |
| 6,186,274 | B1 | * | 2/2001 | Reynolds et al. | 182/138 |
| 6,203,234 | B1 | | 3/2001 | Olson | 403/254 |

* cited by examiner

Primary Examiner—Robert W. Gibson, Jr.
(74) Attorney, Agent, or Firm—IPLM Group, P.A.

(57) ABSTRACT

A shelf assembly includes at least one shelf supported by vertical posts, and a net having opposite sides connected to respective posts so that the net spans at least one edge of the shelf and an associated area above the shelf.

14 Claims, 6 Drawing Sheets

NET ANCHORAGE METHODS AND APPARATUS

This application claims the benefit of U.S. provisional application No. 60/267,071 filed Feb. 7, 2001, and U.S. provisional application No. 60/272,278 filed Feb. 28, 2001.

FIELD OF THE INVENTION

The present invention relates to methods and apparatus for anchoring a net in a vertical orientation relative to a support structure.

BACKGROUND OF THE INVENTION

Among other things, a net may be used as a barrier across the front of a shelf to prevent items on the shelf from falling. Ideally, such an arrangement should be relatively inexpensive to manufacture, easy to install, and reliable in use. Also, convenient access to the items on the shelf may be desired, in which case, the net should be readily movable into and out of its "barrier" position relative to the shelf.

SUMMARY OF THE INVENTION

The present invention may be described in terms of a net anchorage system and/or a shelving assembly. In a preferred application, at least one shelf is supported at or near its corners by respective vertical posts, and a net spans at least one edge of the shelf and a storage area above the shelf. The net is supported by net supports that are connected to first and second posts proximate respective forward corners of the shelf or storage area. At least one side of the net is preferably connected to its respective post by means of quick-release fasteners. Many features and/or advantages of the present invention will become more apparent from the detailed description which follows.

BRIEF DESCRIPTION OF THE DRAWING

With reference to the Figures of the Drawing, wherein like numerals represent like parts and assemblies throughout the several views.

DETAILED DESCRIPTION OF THE PREFERRED EMBODIMENT

The present invention may be used in connection with and/or described with reference to shelving. Among other things, the present invention is useful for securing a net along at least one edge of a shelf and across the storage space disposed above the shelf. When properly installed, the net reduces the possibility of objects falling from the shelf and suffering damage and/or inflicting injury.

Figure 1:
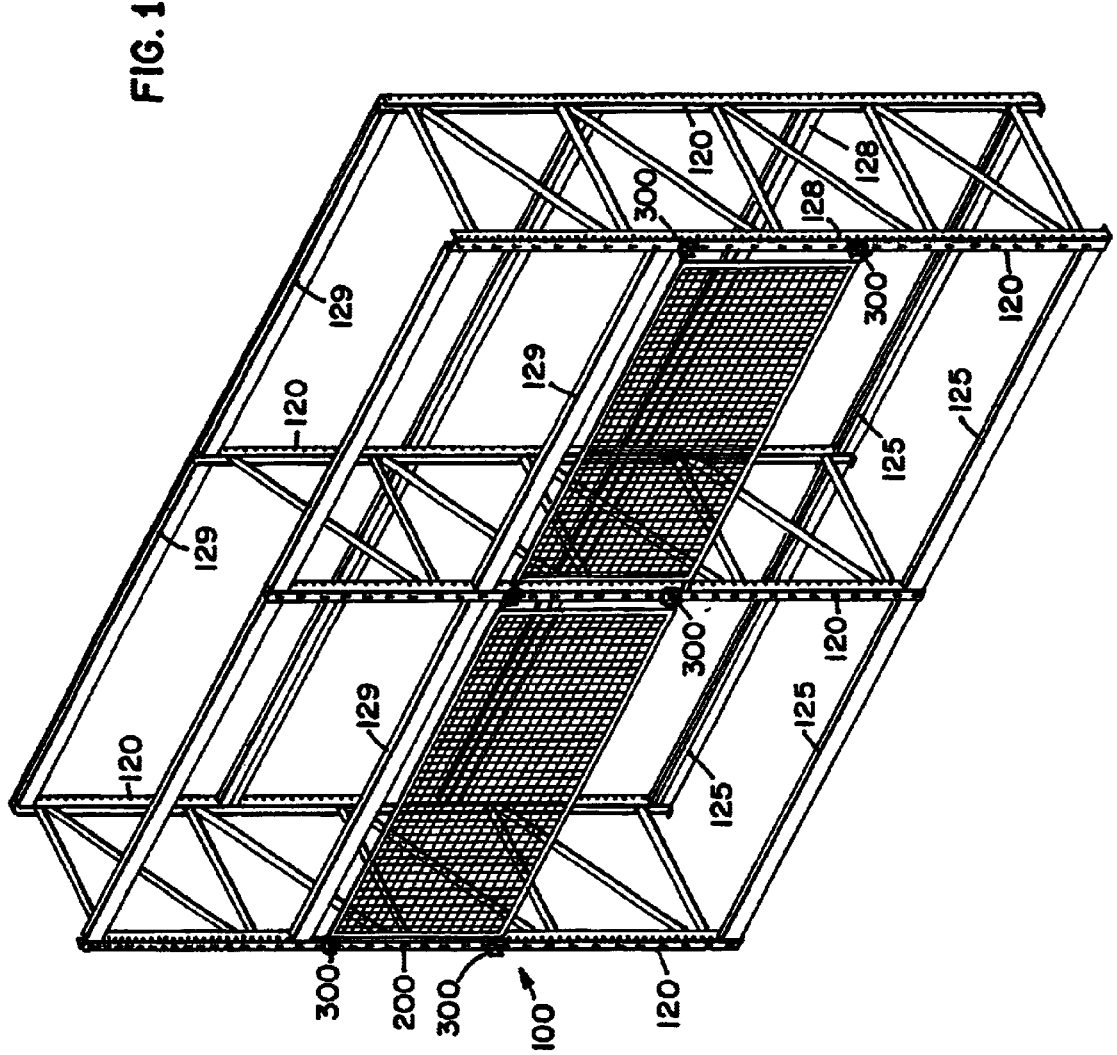
FIG. 1 is a perspective view of a shelving assembly having a shelf net arrangement constructed and installed according to the principles of the present invention.

FIG. 1 shows a shelf assembly 100 that includes vertical support posts 120 and horizontal supports 125, 128, and 129 which are supported by the posts 120 in a manner known in the art. The supports 125, 128, and 129 may themselves function as shelves for large objects and/or skids, or sheet members may be secured thereto to define shelves having a continuous support surface. In accordance with known practices, keyhole-shaped openings 124 (see FIG. 2) extend through an outwardly facing wall of each post 120. Each opening 124 includes a relatively upward portion that may be described as a circular hole, and a relatively downward portion that may be described as a slot having a width that is smaller than the diameter of the hole. The openings 124 are arranged in two, laterally aligned columns extending lengthwise along the post 120. Also, holes 122 (see FIG. 2) extend through opposite sides of each post 120. Among other things, the holes 122 and/or the openings 124 may be used to interconnect the posts 120 and the supports 125, 128, and 129.

In accordance with the present invention, a net 200 extends along the forward edge of the shelf space defined between the supports 128, and spans a storage space disposed above same. Each side of the net 200 is secured to a respective post 120 by means of respective net anchors 300. The net 200 prevents objects from falling off the supports 128 or a shelf top associated therewith.

Figure 2:
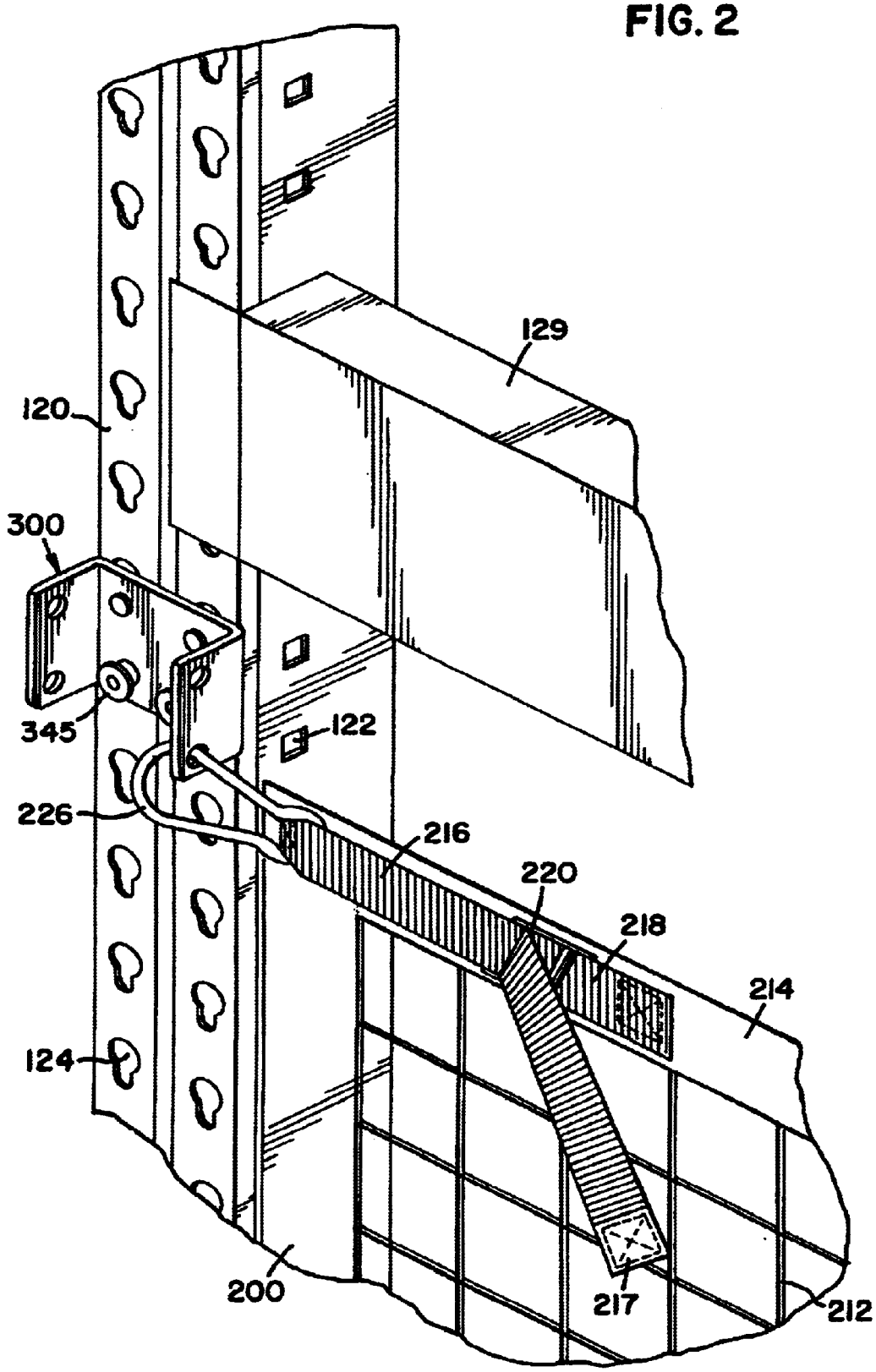
FIG. 2 is a fragmented perspective view of the shelving assembly of FIG. 1.

As shown in FIG. 2, the net 200 includes a mesh panel 212, and a border 214 secured about the perimeter of the mesh panel 212. A first strap 216 has one end secured to the net border 214 (generally behind carabiner 226), and an opposite distal end 217. A second strap 218 has opposite ends secured to the net border 214, and an intermediate portion secured to a buckle 220. The distal end 217 of the first strap 216 is threaded through the buckle 220 in a manner that allows adjustment of the first strap 216 relative to the buckle 220. A carabiner 226 is mounted on an intermediate portion of the first strap and available for connection to a net anchor 300.

Figure 3:
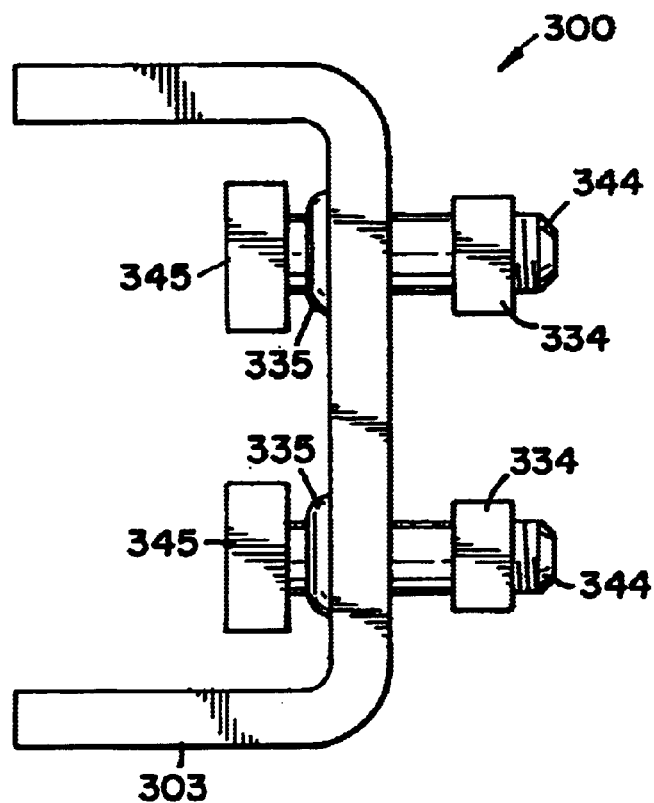
FIG. 3 is a top view of a net support on the shelving assembly of FIG. 1.
Figure 4:
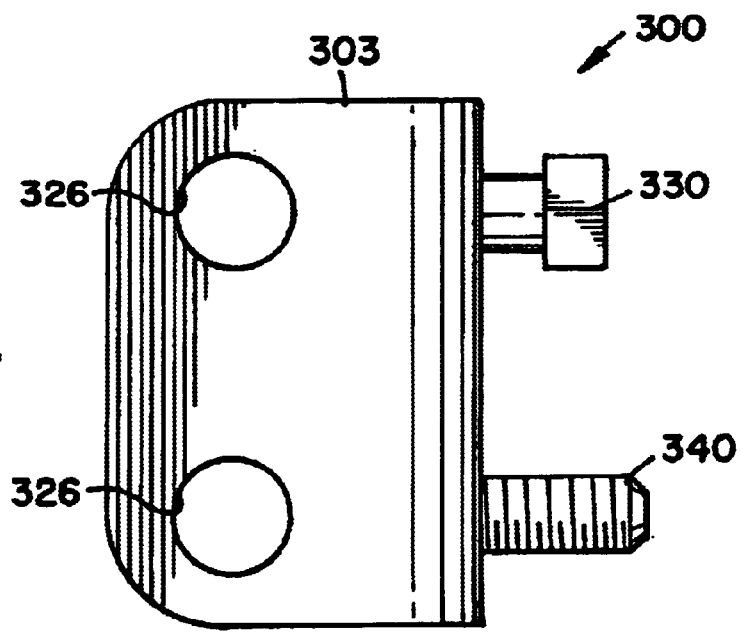
FIG. 4 is a side view of the net support of FIG. 3.

One of the net anchors 300 is shown by itself in FIGS. 3–4. The net anchor 300 includes a generally U-shaped member 303 that is preferably made of steel. Two holes 326 extend through each leg or wing of the member 303 to provide anchor points for a carabiner 226 or other suitable fastener. First and second pegs 330 are rigidly secured to an upper portion of the member 303. Each peg 330 includes a base portion 335 that is secured to the member 303, and a latching portion 334 that projects outward from the member 303 and presents a generally T-shaped profile. Each latching portion 334 is sized and configured for insertion through the hole portion of an opening 124, downward movement in the opening 124, and retention within the slot portion of the opening 124.

First and second bolts 340 are threaded into a lower portion of the member 303. Each bolt 340 includes a head 345 sized and configure to be engaged by a tool, and a threaded shaft 344 sized and configured for insertion into the hole portion of an opening 124. The relative positions of the bolts 340 and the pegs 330 are such that the bolts 340 fit into the upper portions of respective first openings 124 when the pegs 330 occupy the lower portions of respective second openings 124 disposed immediately above the first openings 124. In other words, the bolts 340 may be threaded into respective openings 124 to prevent upward movement of the anchor 300 relative to the post 120.

Those skilled in the art will recognize that other fasteners may be used in lieu of the bolts 340 for purposes of securing the anchor 300 in place relative to the post 120. For example, spring loaded plungers may be provided on the anchor in a manner that biases the plungers into respective openings 124. The plungers may be pulled outward, against the bias of a spring, to free the anchor for movement relative to the post. One example of such a plunger is designated as 10 in U.S. Pat. No. 6,203,234 to Olson, which is incorporated herein by reference.

Figure 5:
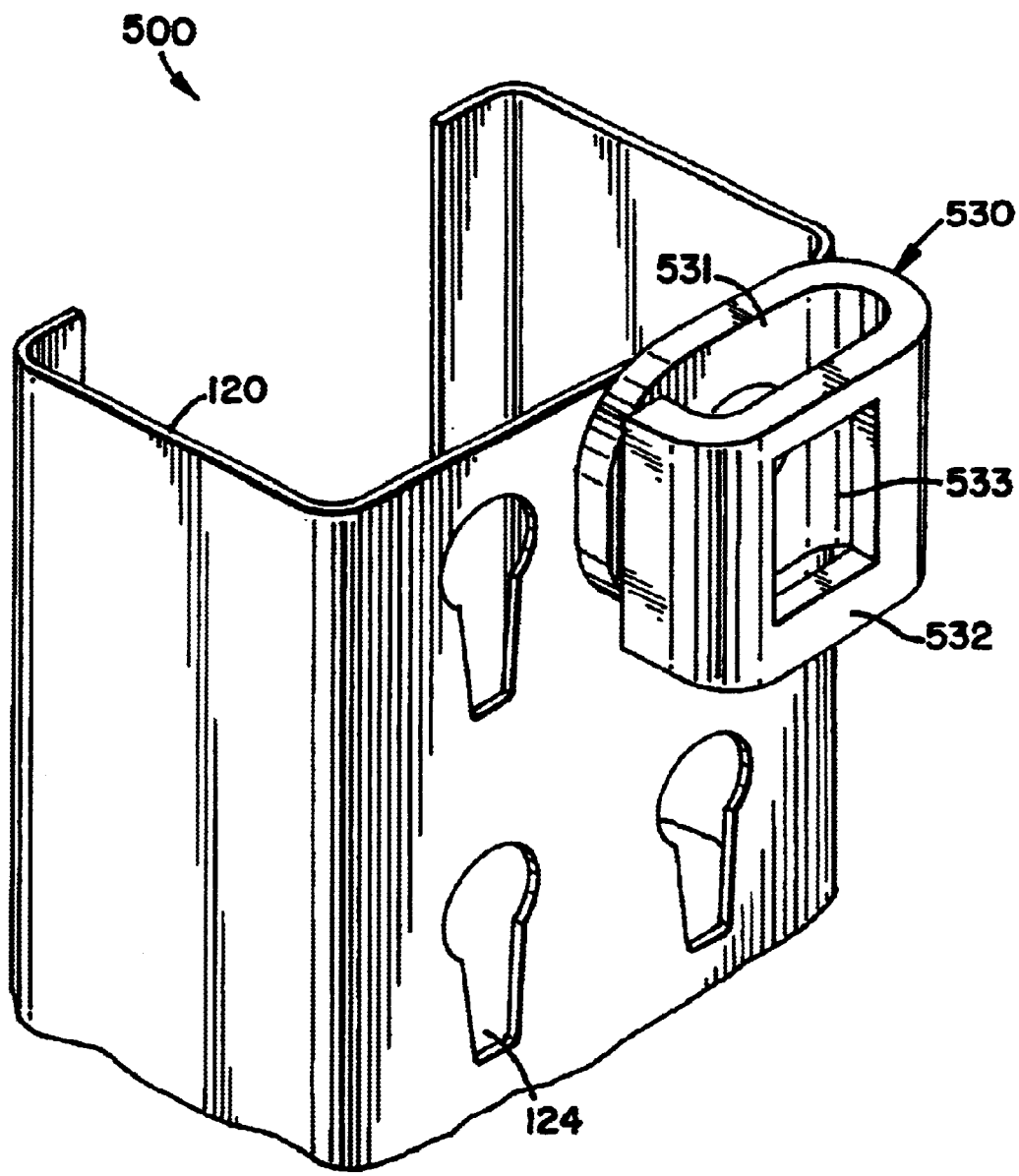
FIG. 5 is a fragmented perspective view of an alternative embodiment net supporting arrangement suitable for use on the shelving assembly of FIG. 1.
Figure 6:
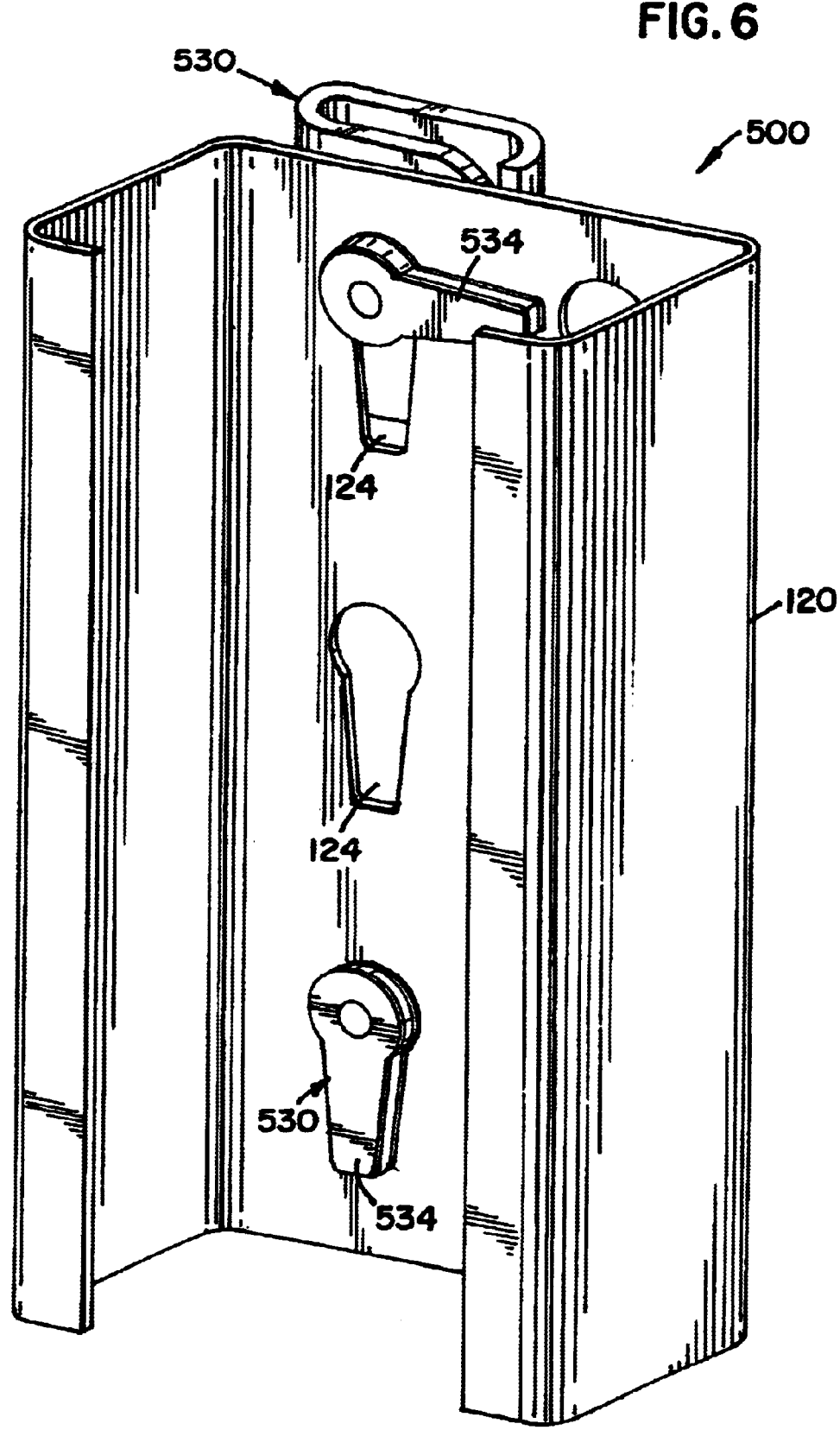
FIG. 6 is a fragmented, generally opposite perspective view of the net supporting arrangement of FIG. 5.

FIGS. 5–6 show an alternative embodiment net supporting arrangement 500 suitable for use on the shelving assembly 100. The arrangement 500 includes fasteners 530 having a key 534 that is sized and configured to fit through an opening 124 when properly oriented relative thereto, and a base 531 that is too large to fit through the opening 124. The key 534 and the base 531 define a gap therebetween, and the width of the gap is approximately equal to the wall thickness of the post 120. A shaft (not shown) spans the gap and is interconnected between the key 534 and the base 531. The base 531 cooperates with an opposing member 532 to form a substantially closed loop or clip. An opening or window 533 in the opposing portion 532 is configured to accommodate a tool that is configured to register with the base portion 531. The opening 533 may also be configured to receive a carabiner 226 on a net. In the alternative, an edge strand or loop of a net may simply be inserted or clipped between the opposing portion 532 and the base 531.

The fastener 530 may be connected to the post 120 by aligning the key 534 with the opening 124 (like the lower fastener 530 in FIG. 6); inserting the key 534 through the opening 124; and turning the fastener 530 ninety degrees to a latched position relative to the post 120 (like the upper fastener 530 in FIG. 6). The fastener 530 may be removed from the post 120 by aligning the key 534 with its associated opening 124 and pulling the fastener 530 away from the post 120.

Figure 7:
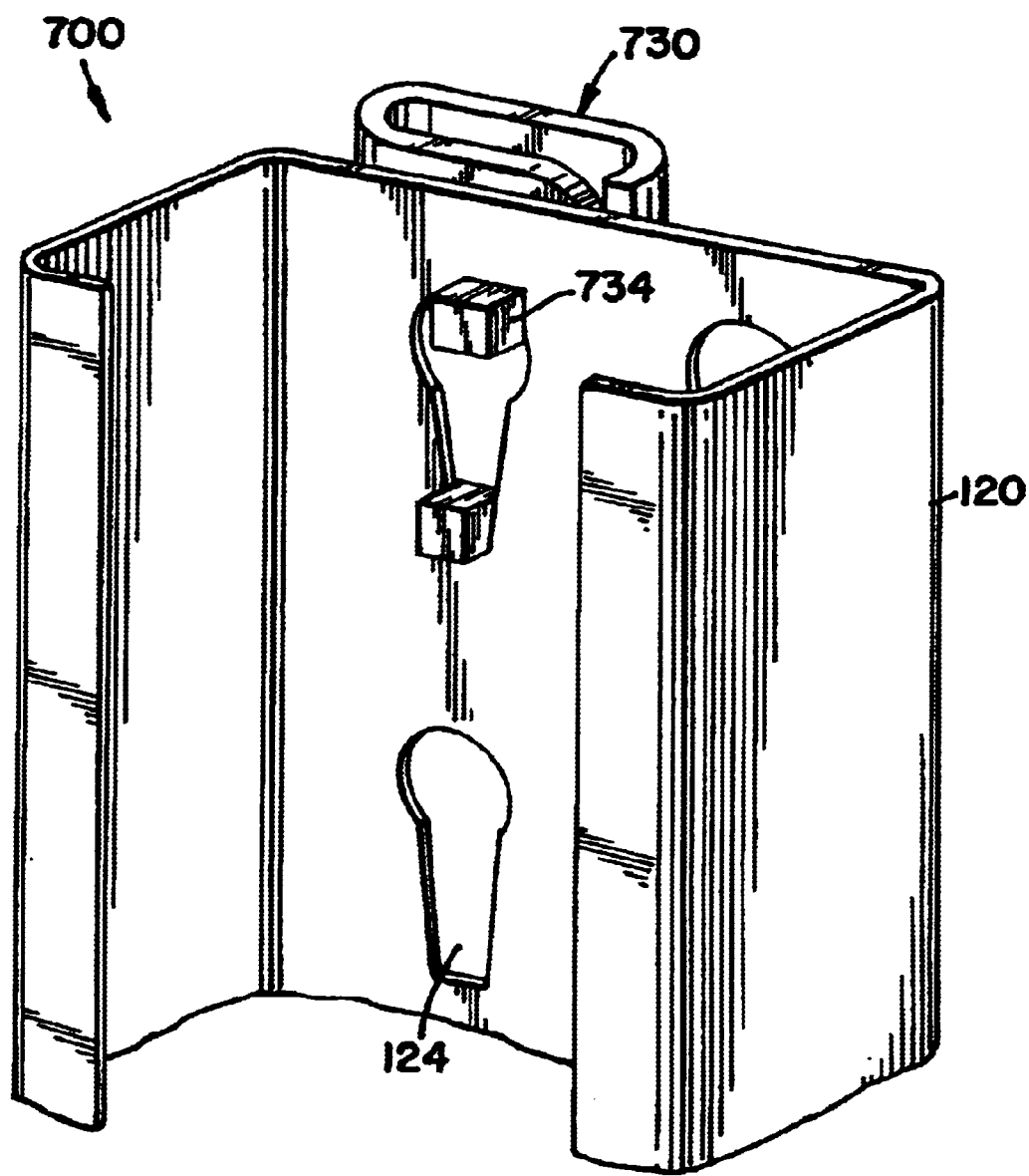
FIG. 7 is a fragmented perspective view of another alternative embodiment net supporting arrangement suitable for use on the shelving assembly of FIG. 1.

FIG. 7 shows another fastener 730 with a similar clip arrangement, but an alternative means for mounting to the post 120. More specifically, opposing, resilient prongs 734 protrude outward from the base 531, in a direction opposite the opposing portion 532. Each prong 734 has a shaft portion and a relatively larger head portion at the distal end of the shaft portion. The lower head portion may be inserted through the keyhole 124 and force downward until the upper head portion snaps into place inside the keyhole 124. One or both of the head portions may be contoured to facilitate insertion through the keyhole 124. In any event, the two prongs 734 are configured to deflect away from one another to retain the fastener 730 in place relative to the post 120.

Among other things, those skilled in the art will recognize that the features of the various embodiments may be mixed and matched. For example, the prongs 734 on the fastener 730 may be substituted for the pegs 330 and the bolts 340 on the anchor member 300. Also, the present invention may be described in terms of various methods that are performed in assembling and/or using the embodiments disclosed herein. Finally, in addition to setting forth specific embodiments and particular applications, the foregoing disclosure will also lead those skilled in the art to recognize additional embodiments, applications, and/or improvements that nonetheless fall within the scope of the present invention. In view of the foregoing, the scope of the present invention should be limited only to the extent of the following claims.

What is claimed is:

1. A storage assembly, comprising:
   a plurality of vertical shelf posts and horizontal shelf supports configured and arranged to define at least one shelf space having a shelf length that is measured perpendicular to said shelf posts;
   a net sized to span said shelf length; and
   a plurality of discrete net holders connected to said net and configured to engage respective keyhole-shaped openings in said posts, wherein each of said net holders includes pegs that are secured within lower portions of first keyhole-shaped openings in one of said posts, and bolts that are secured within upper portions of second keyhole-shaped openings in said first one of said posts, and said second keyhole-shaped openings are disposed directly below said first keyhole-shaped openings.

2. The storage assembly of claim 1, wherein carabiners are interconnected between said net and respective net holders.

3. A storage assembly, comprising:
   a plurality of vertical shelf posts and horizontal shelf supports configured and arranged to define at least one shelf space having a shelf length that is measured perpendicular to said shelf posts;
   a net sized to span said shelf length, wherein adjustable length straps are secured to each of four corners on said net;
   four net anchors releasably mounted on respective posts proximate each of four corners bounding a forward edge of said shelf space; and
   four quick release connectors releasably interconnected between respective net anchors and respective straps on said net.

4. The storage assembly of claim 3, wherein each of said net anchors includes a peg that is sized and configured for retention within a keyhole-shaped opening in a respective one of said posts, and a bolt that is sized and configured for projection through an adjacent keyhole-shaped opening in said respective one of said posts to prevent removal of said peg from its keyhole-shaped opening.

5. A storage assembly, comprising:
   a plurality of vertical shelf posts and horizontal shelf supports configured and arranged to define a first shelf space to a first side of one of said posts and a second shelf space to a second side of said one of said posts, wherein each said shelf space defines a shelf length that is measured perpendicular to said one of said posts;
   a first net sized to span said shelf length associated with said first shelf space;
   a second net sized to span said shelf length associated with said second shelf space;
   a first net anchor and a second net anchor, wherein each said net anchor is releasably mounted on said one of said posts and presents at least one anchor point proximate said first shelf space and at least one anchor point proximate said second shelf space, and one of said straps on each said net is connected to said first net anchor, and one of said straps on each said net is connected to said second net anchor.

6. The storage assembly of claim 5, wherein each said net anchor includes a U-shaped plate having a base and opposite side flanges.

7. The storage assembly of claim 6, wherein at least one hole extends through each of said flanges to define a respective anchor point.

8. The storage assembly of claim 6, wherein first and second pegs are rigidly mounted on said plate and extend away from said plate in a direction opposite said flanges.

9. The storage assembly of claim 8, wherein each of said pegs has a T-shaped profile when viewed from above.

10. The storage assembly of claim 9, wherein first and second fasteners are movably mounted on said plate for movement perpendicular to said plate.

11. The storage assembly of claim 10, wherein each of said fasteners is vertically aligned with a respective one of said pegs.

12. The storage assembly of claim 11, wherein each of said fasteners is a bolt threaded into said plate.

13. The storage assembly of claim 6, wherein adjustable length straps are secured to upper and lower corners on at least one side of each said net.

14. The storage assembly of claim 13, wherein a respective carabiner is mounted on each of said straps.

* * * * *

UNITED STATES PATENT AND TRADEMARK OFFICE
CERTIFICATE OF CORRECTION

PATENT NO.     : 6,698,604 B2
DATED          : March 2, 2004
INVENTOR(S)    : David S. Denny, George H. Merritt and Barry J. Austin It is certified that error appears in the above-identified patent and that said Letters Patent is hereby corrected as shown below:

<u>Column 4,</u>
Line 66, add --15. The storage assembly of claim 14, wherein each of said net holders is releasably clipped to said net. --

Signed and Sealed this

First Day of June, 2004

JON W. DUDAS
*Acting Director of the United States Patent and Trademark Office*